United States Patent [19]
Trahey et al.

[11] Patent Number: 5,673,699
[45] Date of Patent: Oct. 7, 1997

[54] METHOD AND APPARATUS FOR ABBERATION CORRECTION IN THE PRESENCE OF A DISTRIBUTED ABERRATOR

[75] Inventors: Gregg E. Trahey, Hillsborough; Gary C-H Ng; William F. Walker, both of Durham, all of N.C.; Paul D. Freiburger, Issaquah, Wash.

[73] Assignee: Duke University, Durham, N.C.

[21] Appl. No.: 657,793

[22] Filed: May 31, 1996

[51] Int. Cl.$^6$ ...................................................... A61B 8/00
[52] U.S. Cl. ...................................................... 128/661.01
[58] Field of Search .................. 128/660.06, 660.07, 128/660.08, 661.01; 73/625, 626

[56] References Cited

U.S. PATENT DOCUMENTS

| | | | |
|---|---|---|---|
| 4,835,689 | 5/1989 | O'Donnell | 364/414 |
| 4,989,143 | 1/1991 | O'Donnell et al. | 364/413.25 |
| 5,268,876 | 12/1993 | Rachlin | 367/7 |
| 5,331,964 | 7/1994 | Trahey et al. | 128/661.01 |
| 5,487,306 | 1/1996 | Fortes | 73/597 |
| 5,531,117 | 7/1996 | Fortes | 128/661.01 |
| 5,566,675 | 10/1996 | Li et al. | 128/661.01 |

OTHER PUBLICATIONS

M. Fink et al, "Self-focusing in Inhomogeneous Media With 'Time Reversal' Acoustic Mirrors", IEEE Ultrasonic Symposium Proceedings, pp. 681–686 (1989).
Krishnan et al., "Two-Step Aberration Correction", 17 Ultrasonic Imag., No. 1, p. 62 (1995). Abstract. 4.4.
Gary C. Ng et al., "Speckle Target Adaptive Imaging Techniques for Distributed Phase Aberrations," 17 Ultrasound Imag. No. 1, p. 63 (1995). Abstract 4.6.
Yue Li, "Phase Aberration Correction Algorithm Using Near–Field Signal Redundancy Method: Algorithm," 17 Ultrasound Imag. No. 1, p. 64 (1995). Abstract 4.7.
Yue Li, "Phase Aberration Correction Algorithm Using Near–Field Signal Redundancy Method: Experimental Results." 17 Ultrasound Imag. No. 1, p. 64 (1995). Abstract 4.8.
Yue Li, "Workshop on Beaberration of Ultrasound Propagating in Inhomogenous Media." Abstract 4.7 and 4.8 and Figs., Valley Forge Research Center, U. Penn., The Moore School of Electrical Engineering, Phila, Pa., 19174 (1995).
R. W. Lee et al., "Weak Scattering in Random Media, With Applications to Remote Probing," Proc. IEEE, vol. 57, No. 4, pp. 375–406 (1969).
D.–L. Liu et al., "Time–Shift Compensation of Ultrasonic Pulse Focus Degradation Using Least Mean Square Error Estimates of Arrival Time," J. Acoust. Soc. Am., vol. 95, No. 1, pp. 542–555, (1994).

(List continued on next page.)

*Primary Examiner*—George Manuel
*Attorney, Agent, or Firm*—Bell, Seltzer, Park & Gibson

[57] ABSTRACT

Disclosed is an ultrasonic phase aberration correction method and apparatus. One preferred embodiment employs a translating transmit aperture for transmitting two separately transmitted pulses through two different transmit apertures but which are focused to the same predetermined target in the human body. A receiver element measuring a first echo from a first transmit pulse is matched with a receiver element measuring a second echo from a second transmit pulse from a translated aperture, the match corresponding to receivers with a separation equal and opposite to the spatial translations of the translated transmit apertures. The matched elements are compared for signal variations which estimate phase aberrations and especially improve on estimates of distributed aberrations. The transmit or receive signals can then be compensated for or adjusted based on the signal comparison and variation estimates. It is also disclosed that the use of phase spectra analysis with a translating aperture improves aberration correction. Further, the use of a translating aperture with cross-correlation techniques also indicates improved correlations.

28 Claims, 9 Drawing Sheets

OTHER PUBLICATIONS

P.-C. Li et al., "Improved Detectability with Blocked Element Compensation," Ultrason. Imag., vol. 16, pp. 1–18 (1994).

Gregg Trahey et al., "Experimental Results with a Real–Time Adaptive Ultrasonic Imaging System for Viewing Through Distorting Media," vol. 37, No. 5, pp. 418–427 (1990).

S.W. Flax et al., "Phase Aberration Correction Using Signals From Point Reflectors and Diffuse Scatterers: Basic Principles," IEEE Trans. Ultrason. Ferroelec. Freq. Contr., vol. 35, No. 6, pp. 758–767 (1988).

G.C. Ng et al., "A Comparative Evaluation of Several Algorithms for Phase Aberration Correction," IEEE Trans. Ultrason. Ferroelec. Freq. Contr., vol. 41, No. 5, pp. 631–643 (1994).

L.M. Hinkelman et al., "Measurement of Ultrasonic Pulse Arrival Time and Energy Level Variations Produced by Propagation Through Abdominal Wall," J. Acoust. Soc. Am., vol. 95, No. 1, pp. 530–541 (1994).

M. Fink, "Time Reversal Focusing of Ultrasonic Fields: Part I: Basic Principles," IEEE Trans. Ultrason. Ferroelec. Freq. Contr., vol. 39, No. 5, pp. 555–566 (1992).

R. Mallart et al., "The van Cittert–Zernike Theorem in Pulse Echo Measurements," J. Acoust. Soc. Am., vol. 90, No. 5, pp. 2718–2727 (1991).

J.A. Jensen et al., "Calculation of Pressure Fields from Arbitrarily Shaped, Apodized, and Excited Ultrasound Transducers," IEEE Trans. Ultrason. Ferroelec. Freq. Contr., vol. 39, No. 2, pp. 262–267 (1992).

Daniel Rachin, "Direct Estimation of Aberrating Delays in Pulse–Echo Imaging Systems", J. Acoust. Soc. Am, vol. 88, pp. 191–198, No. 1, 1990.

Mustafa Karaman et al., "A Phase Abberation Correction Method for Ultrasound Imaging", IEEE Trans. on Ultrasonics, Ferroelectrics, and Frequency Control, vol. 40, No. 4, pp. 275–282, 1993.

John W. Hardy, "Adaptive Optics", Scientific American, pp. 60–65, 1994.

Mustafa Karaman, et al., "Influence of Missing Array Elements on Phase Aberration Correction for Medical Ultrasound", IEEE Trans. on Ultrasonics, Ferroelec, and Freq. Contr., vol. 41, No. 5, pp. 613–620, 1994.

Danhua Zhao et al., "A Statistical Analysis of Phase Aberration Correction Using Image Quality Factors in Coherent Imaging Systems", IEEE Trans. on Med. Imag., vol. 11, No. 3, pp. 446–452, 1992.

Li Weng et al., "Moments and Phase of Non–Rayleigh Speckle Statistics Applied to Ultrasound Image Analysis", IEEE Eng. in Med. and Bio. Soc., vol. 12, No. 1, pp. 333–334, 1990.

V.L. Newhouse et al., "A Split Spectrum Processing Method of Scatterer Density Estimation", Dept. of Elec. and Comp. Eng. and Bio. Eng. and Science Inst., Drexel University, Philadelphia, PA, NATO ASI Series F, vol. 144; 49–69 ISBN:0387–19100–3 (1988).

Pai–Chi Li et al., "Phase Aberration Correction on Two–Dimensional Conformal Arrays", IEEE Trans. on Ultrason., Ferroelc. Freq. Contrl. vol. 42, No. 1, pp. 73–82, 1995.

Li Yue, et al., "Two Signal Processing Techniques for the Enhancement of the Flaw–to–Grain Echo Ratio", Ultrasonics, vol. 25, pp. 90–94 (1987).

Bernard D. Steinberg, "A Discussion of Two Wavefront Aberration Correction Procedures", Ultrasonic Imaging, No. 14, pp. 387–397 (1992).

Stephen J. Norton, "Adaptive Imaging in Aberrating Media: A Broadband Algorithm," Ultrasonic Imag. vol. 14, pp. 300–321 (1992).

Levin Nock et al., "Phase Aberration Correction in Medical Ultrasound Using Speckle Brightness as a Quality Factor", J. Acoust. Soc. Am., vol. 85, No. 5 (1989).

C. Prada et al., "The Iterative Time Reversal Mirror: A Solution to Self–Focusing in the Pulse Echo Mode", J. Acoust. Soc. Am, vol. 90, No. 2, pt. 1, pp. 1119–1129 (1991).

M. Karaman et al., "Experimental Analysis of a Computationally Efficient Phase Aberration Correction Technique", IEEE 1992 Proc. Ultrasonics Syposium, pp. 619–622 (1992).

Gary C. Ng et al., "A New Technique for Adaptive Imaging in the Presence of Distributed Aberrations", 1995 IEEE Ultrasonics Symposium, pp. 1455–1459 (1995).

Matthew O'Donnell et al., "Correlation –Based Aberration Correction in the Presence of Inoperable Elements", IEEE Trans. on Ultrason. Ferroelec., and Freq. Contr., vol. 39, No. 6, (1992).

William F. Walker, "Adaptive Ultrasonic Imaging Performance for Near–Field Aberrating Layers", Department of Biomedical Engineering, Duke University, Dissertation (1995).

Pai–Chi et al., "Adaptive Ultrasound Systems Using Large, Two–Dimensional, Conformal Arrays", 1994 Ultrasonics Symposium, pp. 1625–1628 (1994).

Siriam Krishnan et al., "Adaptive Compensation of Phase and Maganitude Aberrations", IEEE Trans. on Ultrason. Ferroelec. and Freq. Control, vol. 43, No. 1 (1996).

TRANSLATION DIRECTION

METHOD AND APPARATUS FOR ABBERATION CORRECTION IN THE PRESENCE OF A DISTRIBUTED ABERRATOR

This invention was made with Government support under grant number 2R01CA43334-09 from the NIH and grant number CDR-8622201 from the NSF/ERC. The Government has certain rights to this invention.

FIELD OF THE INVENTION

This application relates generally to medical diagnostic ultrasound imaging systems and more specifically relates to improving image resolution by correcting for aberrations in acoustic signals.

BACKGROUND OF THE INVENTION

In operation, an ultrasound imaging apparatus generates acoustic waves which are transmitted by transducer elements into the body. The acoustic waves then echo back from the targeted area into receive elements and the received signals are processed to create an ultrasound image of the targeted area.

It is generally understood that the acoustic waves propagate into the body at a substantially constant velocity, but that the waves can be delayed or advanced by tissue acoustic velocity variations at various depths or locations causing nonuniform wave transmission and/or reception. This nonuniformity causes the pulse/echo signal to be impeded which in turn distorts the signal through a process known as phase aberration. Unfortunately, phase aberrations degrade an ultrasound system's image resolution and image quality.

In general, phase aberrations can be divided into two types—near field aberrations and distributed aberrations. If the non-uniformity is located on or near the surface of the body in a substantially thin layer so as to be adjacent to the array elements or acts to simulate this type of a surface distortion, it is generally known as a near-field aberration. One example of a near-field aberration is the transition area at the wave entry point into the body, i.e., the layer of subcutaneous fat immediately adjacent the transmit elements. This type of aberration generally manifests itself as a time delay which can be estimated and adjusted as a time shift in the signal.

In contrast, distributed aberrations are located away from the transmit/receive elements, making the associated phase aberration harder to accurately model and thus correct. Distributed aberrations (which can include near field aberrations) are dispersed throughout various depths and locations of the wave path and unpredictably introduce phase and amplitude distortion across the frequency spectra of the transmitted and/or received signals.

Another potential obstacle to accurate phase correction performance is speckle interference which is common in ultrasound signals. Speckle originates from complex target configurations typical of most image targets in the human body. Speckle is generally attributed to interference between acoustic wave pulses reflected from a set of diffuse scatterers. This interference causes the received signal magnitude and phase spectra to vary from element to element. See R. Mallart and M. Fink, *The van Cittert-Zernike theorem in pulse echo measurements*, 90 J. Acoust. Soc. Am., no. 5, pp. 2718–2727 (1991).

Nearly all targets in the body exist substantially as speckle targets. In rare cases, a target in the body consists of a single, small, bright reflector. This type of target is generally known as a point target.

In contrast to imaging a speckle target, when imaging a point target in a homogeneous medium, the received echoes at each element have exactly the same magnitude and phase spectra after geometric beamforming. This geometric beamforming generally delays the transmitted and or received signals to compensate for signal delays induced by differences in the path lengths between the target and various transmit or receive elements.

Current phase aberration correction techniques are limited by two important factors. First, most techniques assume that each receive element acquires substantially identical echo signals. In many cases the similarity of these received echoes is measured as a correlation coefficient, wherein typically a correlation coefficient of 1.0 indicates that the signals are substantially identical in shape and lower correlation coefficients indicate less similarity. As has been discussed, this assumption is generally not valid for speckle targets, the most common type of target in the body. Correction techniques which assume that all receivers acquire identical signals will exhibit correction errors and fail to converge to the ideal correction, even after repeated application.

Second, many conventional aberration correction techniques employ electronic methods to correct only for near field aberrations which are more easily compensated for because they manifest themselves as time shift errors. Accordingly, most of the previously proposed techniques "correct" by applying compensating time delays or adjustments to the normal system programmed delays typically associated with geometric beamforming.

In contrast, distributed aberrators introduce more complex signal distortions such as phase and amplitude spectra distortions, therefore techniques employing only time shift delays are insufficient to properly correct for distributed aberrators.

One type of signal correction, proposed by Fink et al., as discussed in *Self-focusing in Inhomogeneous Media With 'Time-Reversal' Acoustic Mirrors*, 2 IEEE Ultrasonic Symposium Proceedings (1989), employs a time reversal "acoustic" mirror. In effect, the transducer elements receive a signal, stores it and re-emits it in a time reversed version of the signal, i.e., last-in first-out scheme, from the same transmit elements to attempt to cancel the distortions introduced in the respective acoustic wave paths. However, Fink et al. is directed to point targets which, as discussed above, are generally uncommon in targets associated with human imaging. Fink et al. does not resolve the more common image resolution problems attributed to distributed aberrators in the presence of speckle.

Another type of correction method is proposed by Rachlin in U.S. Pat. No. 5,268,876, entitled *Method of Estimating Near Field Aberrating Delays*. Rachlin describes transmitting single pulses from each of a number of individual transmitting elements. Each transmit element is paired with a receive element such that each transmit/receive pair shares a common midpoint. Receive echoes are then correlated to estimate time delays which are in turn processed using a matrix formulation to estimate an aberration profile. Rachlin does not resolve image problems attributed to distributed aberrators, especially in the presence of speckle. In addition, the use of a non-focused and non-steered pulse from a single transmitting element means that weak echoes are received from a large arc of tissue. This generally results in a poor signal to noise ratio ("SNR") and restricts Rachlin's proposed method to compact targets. See D. Rachlin, *Direct Estimation of Aberrating Delays in Pulse-Echo Imaging Systems*, 88 J. Acoust. Soc. Am., no. 1, pp. 191–198 (1990).

Y. Li also proposes a correction technique as discussed in *Phase Aberration Correction Algorithm Using Near-Field Signal Redundancy Method: Algorithm*, 17 Ultrason. Imag., no. 1, p. 64, (1995). Li, like Rachlin, acquires data using common midpoint transmit/receive element pairs and combines delay estimates using a matrix formulation. Like Rachlin, Li generates each transmit pulse from a single transmit element without focusing or steering. Thus, Li's near field signal redundancy technique collects the common midpoint signals, attempts to correct for near field effects and then cross-correlates the midpoint signals. However, like Rachlin, Li uses only a single transmit element at any one time, resulting in the same limitations, i.e., high electronic noise (poor SNR) and receive signal variations from non-directional transmission.

In view of the foregoing, it is an object of the present invention to provide an improved method for correcting signal errors resulting from distributed and/or near-field aberrators.

It is a further object of the invention to improve signal correlation in complex array transducers without decorrelation due to speckle targets.

It is an additional object to provide an improved method for aberration correction which can be practically implemented on existing image systems.

It is an additional object to provide an adaptive calibration technique for adjusting for array non-uniformities or thermal deformations.

SUMMARY OF THE INVENTION

This and other objects are satisfied by the present invention, which includes as a first aspect an improved method of phase aberration correction which in turn, improves system focusing and image quality. The method comprises generating a first ultrasound pulse at a first set of preselected transmit elements to define a first transmit aperture. The first pulse is then focused to a predetermined target point in the body. After focusing, the first pulse is transmitted from the first aperture into the body. Receiving elements receive first pulse echoes from the first transmitted ultrasound pulse at a plurality of receive transducer elements. The received echoes are stored as electronic signal data measured by each of a predetermined number of the plurality of receive elements. A second ultrasound pulse is generated by a second set of preselected transmit elements to define a second transmit aperture but which is spatially translated relative to the first aperture. The second pulse is focused to the same predetermined target location. The second pulse is transmitted from the second transmit aperture into the body. A second plurality of receive elements receive second pulse echoes of the second ultrasound pulse. This pulse echo is processed as electronic signal data corresponding to the pulse echo and measured by each of a predetermined number of said plurality of receive elements. The signal processor then compares variations between said first and second receive signal data to estimate signal variations and corrects for phase aberrations with these estimated signal variations.

A second aspect of the present invention is to correct for phase aberrations in acoustic signals and thereby improve signal quality by generating an ultrasound pulse and focusing the ultrasound pulse to a predetermined target point. The focused pulse is transmitted into the target. A pulse echo corresponding to the transmit pulse is received at a plurality of receive transducer elements and this pulse echo is then stored as electronic signal data corresponding to the received echo as measured by each of a predetermined number of said plurality of receive elements. The signal data includes phase spectra data. The phase spectra variations between predetermined numbers of receive elements are compared to estimate signal variations. The estimated signal variations are then corrected by providing frequency dependent phase spectra compensating adjustment to a signal.

A third aspect of the present invention is to improve signal quality by correcting for distributed aberrations in ultrasound imaging systems comprising generating a first ultrasound pulse at a first set of preselected transmit elements to define a first transmit aperture and focusing the first ultrasound pulse to a predetermined target point. The first focused pulse is then transmitted from a first aperture into the target. Echoes from the first pulse are received at a first plurality of receive transducer elements. This pulse echo is stored as electronic signal data corresponding to the echo as measured at a predetermined number of said plurality of receive elements. A second pulse is generated at a second set of preselected transmit elements to define a second transmit aperture having substantially the same size and shape and which is spatially translated relative to the first aperture. The second pulse is focused to the same target location and is then transmitted from the second aperture. The second pulse echo is received at a second plurality of receive transducer elements. This pulse echo is processed as electronic signal data corresponding to the second echo as measured at each of a predetermined number of the plurality of receive elements. Matched receive elements from the first and second pulses are electronically compared. The signal data includes phase spectra as received at and measured by a preselected number of matched receive elements. The phase spectra data between the first and second receive signals are compared to estimate signal variations and the phase aberrations are corrected with the estimated signal variations.

A fourth aspect of the present invention provides a phased array ultrasound imaging system with a translating mode of operation. The imaging system comprises a transducer array having a plurality of elements. The system has a transmitter for transmitting ultrasound pulses operably associated with the transducer array and an aperture translator electrically associated with the transmitter and the transducer array for adjusting transmit apertures to spatially shift at least two separate transmit pulses to fire from transducer elements contained in spatially shifted apertures. The system also comprises a receiver for receiving echoes of transmitted pulses operably associated with the transducer array and a signal processor, comprising a comparison means for estimating received echo data signal variations from translated transmit pulses and measured by receive elements. The comparison means compares signal variations between matched sets of receive elements. The system further comprises a beamformer operably associated with the signal processor for compensating for geometric array configurations and target relationships and a correcting means operably associated with said signal processor for adjusting a signal to compensate for aberrator caused signal variations.

The foregoing and other objects and aspects of the present invention are explained in detail in the specification set forth below.

BRIEF DESCRIPTION OF THE DRAWINGS

FIGS. 9A and 9B are maps illustrating exemplary alternative array transmit aperture geometries. FIG. 9A showing a pattern which is translated and FIG. 9B showing a translation which is translated in two directions.

DETAILED DESCRIPTION OF THE PREFERRED EMBODIMENTS

The present invention relates to an adaptive ultrasonic pulse echo imaging system which corrects for phase aberrations and which can also calibrate equipment to adjust for thermal changes or provide initial start-up parameters. In a preferred embodiment of the present invention, the transducer transmits at least two pulses from spatially translated transmit apertures. Each of the pulses is preferably transmitted from transmit apertures which are spatially translated from different transmit apertures with respect to the other transmit apertures. The received echoes from these pulses generated from translated transmit apertures are then compared to estimate phase aberration variations without speckle decorrelations normally inherently present in echoes received from complex targets. Additionally and advantageously, the present invention can compare both phase spectra and amplitude spectra variations of a predetermined number of activated elements to more effectively estimate the signal variation induced by distributed aberrators. The term "signal" as used herein can include multiple signals generated by a transmit pulse at multiple transmit elements as well as multiple echo signals received at and measured by receive elements.

Figure 1:
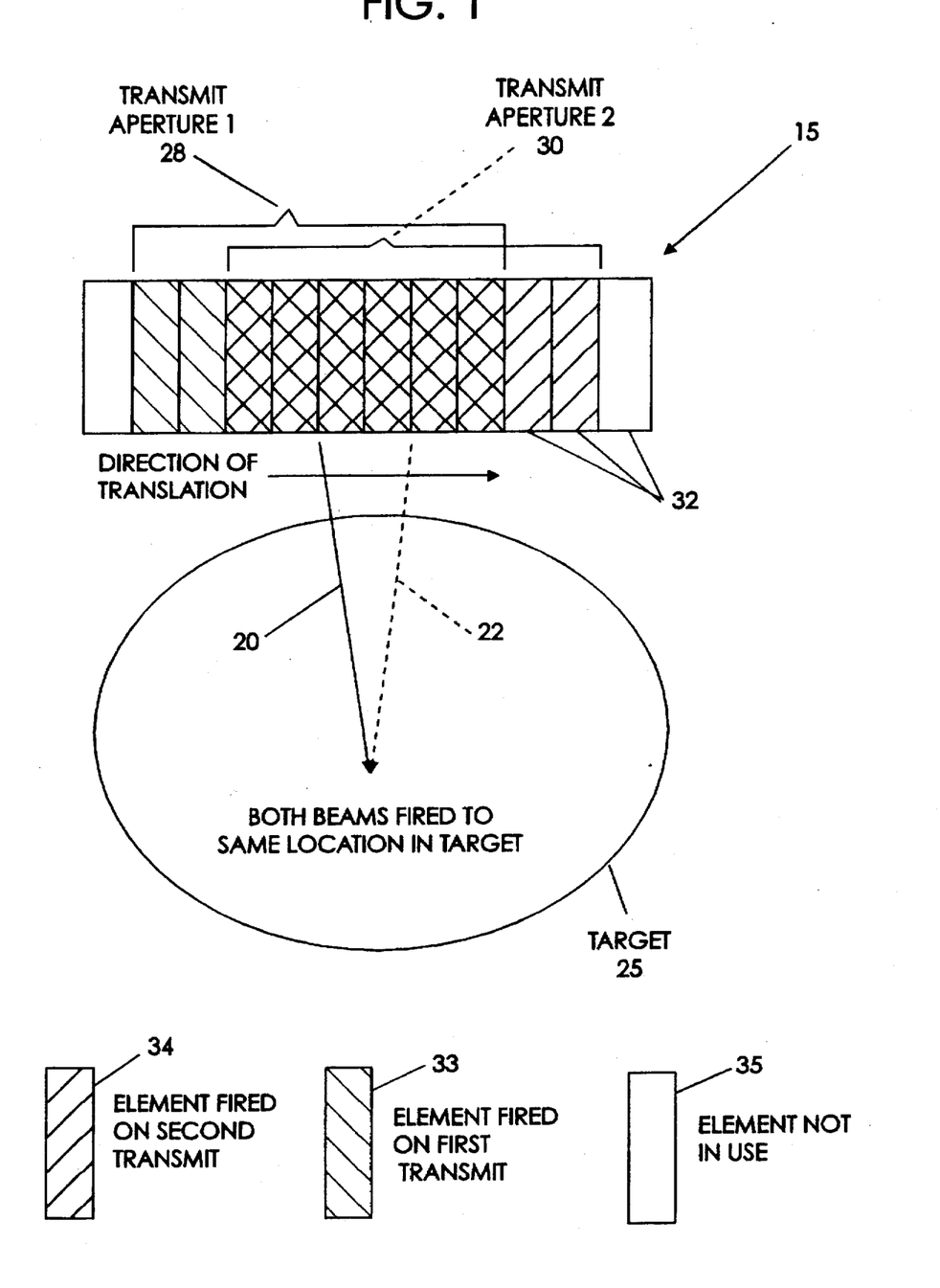
FIG. 1 is a block diagram illustrating a translating transmit aperture showing two pulses focused and transmitted to the same location in a target according to the present invention.

Turning now to FIG. 1, a transducer array 15 transmits a first transmit pulse 20 which is focused and fired from a first transmit aperture 28 to a location in the target 25 tissue. A second transmit pulse 22 is then focused and fired from a second transmit aperture 30 spatially translated or displaced a distance of $\Delta x$ relative to the first transmit aperture 28. The term "focused" as used herein means directing (typically by focusing and steering) a beam or pulse to a specific target point in the body. It should also be noted that while the firing sequence has been described without any intermediary pulse sequences, it will be readily understood by those of skill in the art that one can combine or interject other routinely used pulses intermediate of any translated transmit pulses. Thus, a first pulse can be fired from a first transmit aperture and the results stored in memory for future computation/analysis, other routinely employed pulse and data computations can be performed, and subsequently a second or additional translated pulse can be fired from a translated aperture, as described above. Additionally, although the translated aperture is described as translated between two apertures with two matched receivers, the invention is not limited thereto. For example, multiple transmits and multiple matched elements can also be employed.

The transmit apertures 28, 30 are defined by activated array elements 32. As shown in FIG. 1, the transmit apertures are linearly displaced a distance of 2 elements, the direction of the linear translation indicated by the arrow pointing in the direction of translation. The elements 33 activated or fired on a first transmit is illustrated here in single backward sloping cross-hatch marks. The elements 34 activated or fired on a second transmit are shown as single forward sloping cross-hatch marks. Elements 35 not activated during these pulse sequences are indicated in white.

While the translating transmit apertures are illustrated as a linear displacement, the translation can also be employed in a more complex 2D array transmit geometry—even including a sparse array wherein not every adjacent element is activated or even occupied in the array. For example, in a typical 2D array, a spatial translation can be a translation which is vertically, laterally, or diagonally displaced. In a sparse array, the activated transmit element aperture pattern can also be translated by shifting a subsequent aperture to replicate the activated transmit pattern but which is spatially translated relative to a prior transmit aperture as described above. Of course, an aperture pattern translation can be shifted linearly and still be on an angle relative to a reference axis (shifted in the x and y directions concurrently or shifted in a diagonal manner). As will be discussed below, multiple pulses and/or multi-directional translated transmit apertures (translated in more than one direction) can also be employed.

It is preferred that the transmit apertures maintain the same size and shape for correlation purposes. Thus, if 8 elements are activated on a first transmit pulse, then eight elements are preferably activated on a second transmit pulse. While FIG. 1 has been exaggerated for clarity to show the translating aperture, it will be appreciated that the translation is preferably a small increment of 1, 2, 3-4, or 5-10 (but typically about 10) elements, although the present invention is not limited thereto, and has been tested for correlations at up to a 16 element shift and even larger. See e.g., Gary C. Ng. et al., *A New Technique For Adaptive Imaging in the Presence of Distributed Aberrations*, Proc. 1995 IEEE Ultrason. Symp., pp. 1455–1459, 1995.

In some applications, it may be advantageous to employ larger translations depending on the type of aberrator present in the imaging path or on the type of target chosen as the specified target. For example, a transmit aperture translation of 10–28 elements or even up to 64 elements which provide enough signal information for proper correlation can be employed according to the present invention. Additionally, for some applications it may be advantageous to alter the size or weighting of the aperture. For example, it may be preferable to incrementally enlarge the second or a subsequent aperture in a small amount to increase received echo and signal correlation due to a slight drop in the acoustic view defined by a particular target/array configuration perspective. Additionally, slight adjustments to the amplitude spectra of the transmit and/or receive signal acquired using different transmit aperture locations may yield improved correlations.

Figure 2:
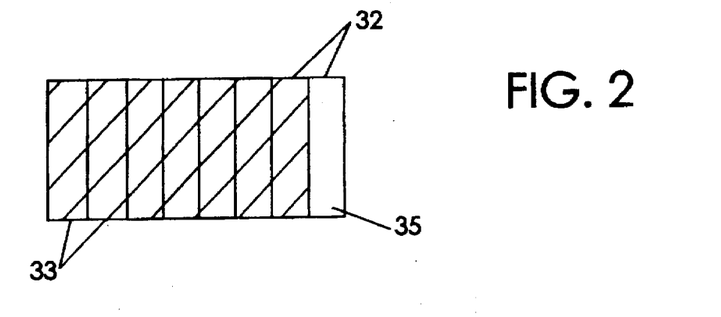
FIG. 2 is a map illustrating array geometry for a first transmit pulse showing a first set of activated transmit elements in gray which defines a first transmit aperture.
Figure 3:
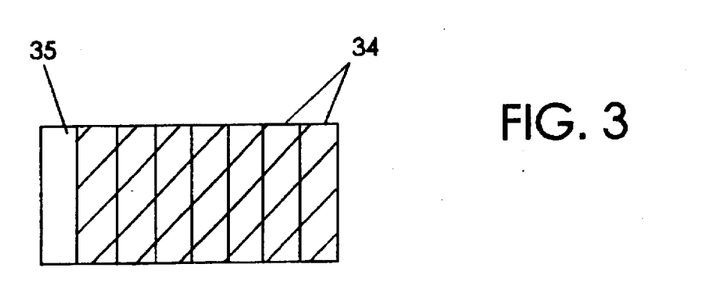
FIG. 3 is a map illustrating array geometry for a second transmit pulse showing a second set of activated transmit elements in gray and which defines a second transmit aperture which is spatially translated from a first transmit aperture.

FIGS. 2 and 3 illustrate one example of translating transmit apertures by indicating the activated or fired transmit elements in gray. FIGS. 2 and 3 illustrate an aperture translation of $\Delta x$ (illustrated in this example as +1 element), indicated by a move in the rightward direction. In FIG. 3, the transmit aperture is the same size and shape as the transmit aperture in FIG. 2, but is spatially translated by a distance of $\Delta x$. This translation is preferably obtained by deactivating one element at the end of the first transmit phased array and activating an element at an opposing end of the phased array. The distance $\Delta x$ can be described as the distance between the centers of adjacent elements or by the size of elements shifted or deactivated between transmit pulses.

Figure 9A:
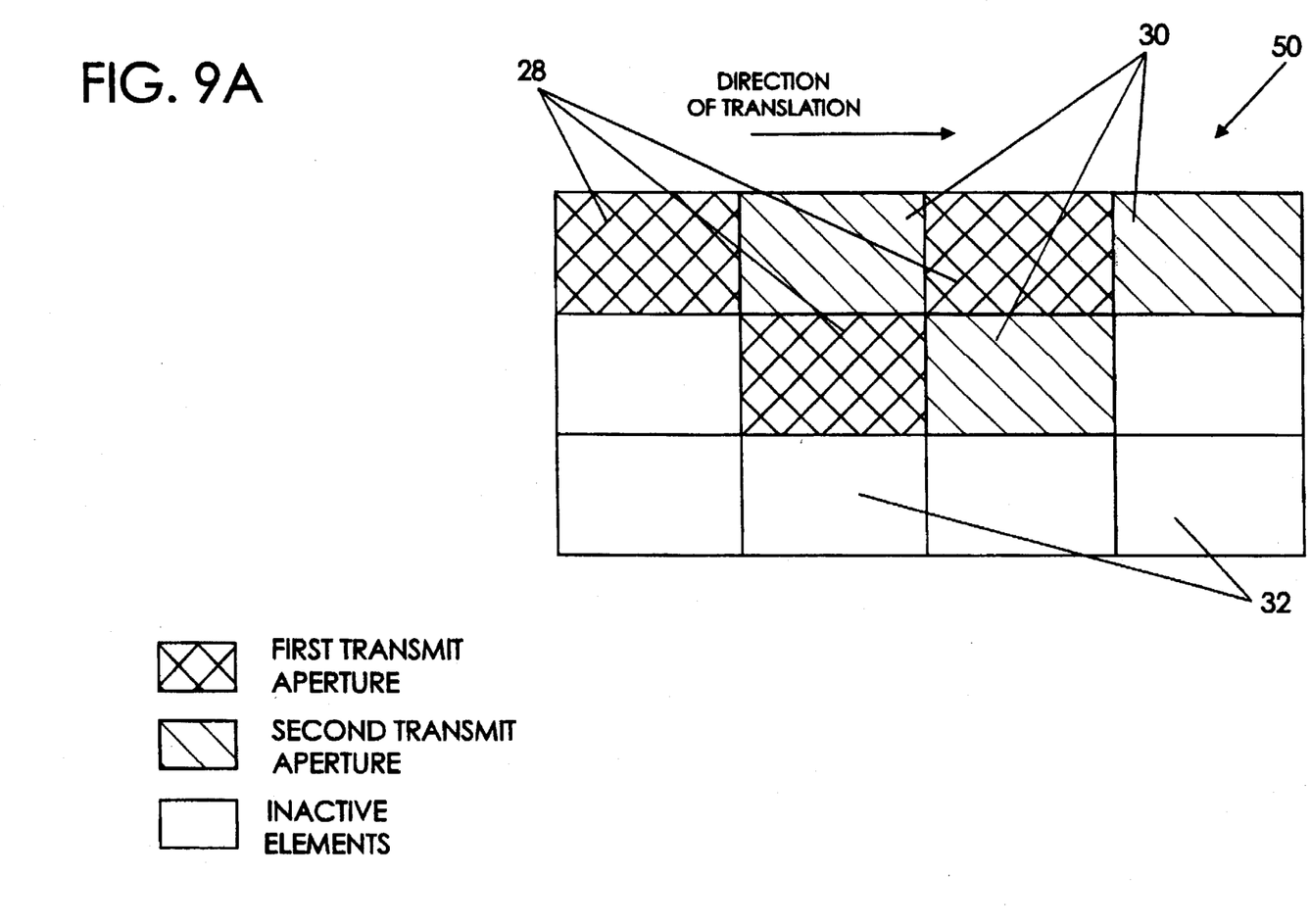
Figure 9B:
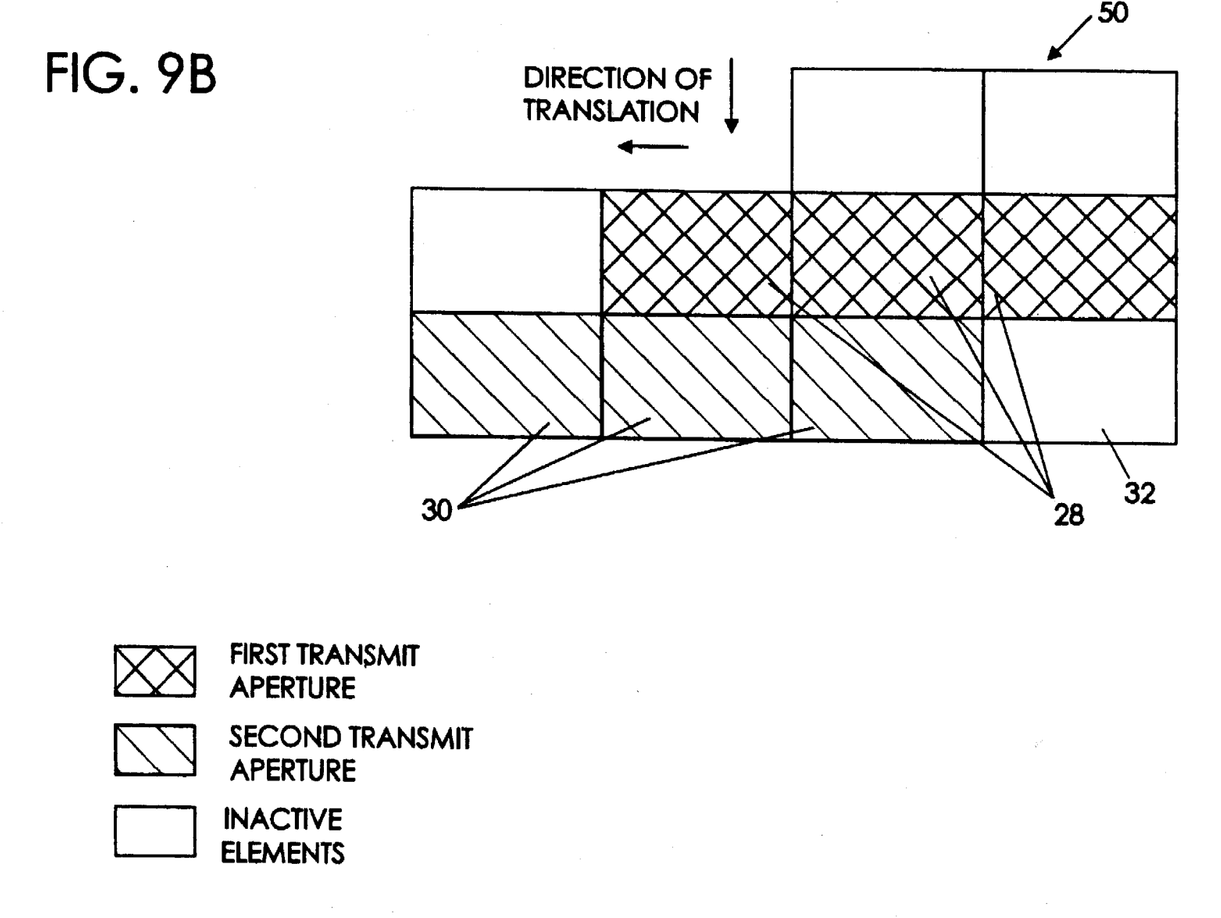

FIGS. 9A and 9B are exemplary illustrations of alternative transmit aperture geometry. A transducer array 50 having a first aperture 28 of activated elements and a second aperture 30 of activated elements. The legend for the elements is located to the side of the figure. The translation direction is indicated by the arrow. Non-activated elements 32 are indicated in white. Of course, these alternatives are merely examples of translating transmit apertures and the invention is not limited thereto.

Figure 4:
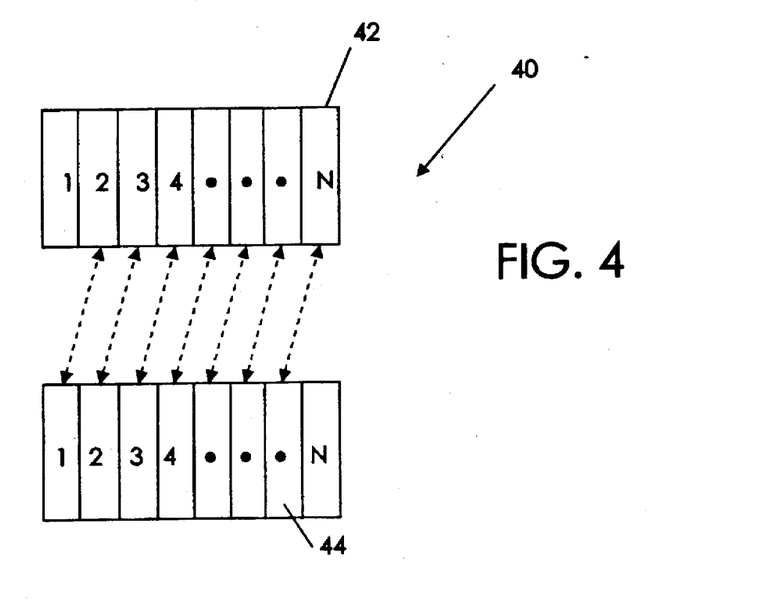
FIG. 4 is a schematic illustrating the receive arrays for each of a first and second transmitted pulse, respectively, the arrows indicating matched receive elements between pulses from translated apertures corresponding to FIGS. 2 and 3.

FIG. 4 shows a map of the matched receive elements 40 corresponding to the translating transmit apertures of FIGS. 2 and 3. The broken arrow lines indicating the pairing of a receive element 42 from the first transmission and a receive element 44 from the spatially translated second transmission. Thus, active element 2 42 in the first echo is matched with active element 1 44 in the second echo. A first plurality of receive elements (first set) receive the echo(es) of a first transmission, while a different plurality of receive elements (second set) receive the echo(es) of the second transmission. Of course, these sets can have elements which are members of both sets of receive elements. However, it will also be noted that while each set may have overlapping members of receive elements, the sets may also have totally separate members. Therefore, different sets is meant to reflect that at least one member or element is different between sets. One illustration of a different receive set having overlapping members is as shown in FIG. 4; while one illustration of exclusively separate members is shown in FIG. 9.

"Matched" receive elements as used herein indicates receive elements that are compared for signal variations between echoes generated from translated pulses. Generally described, between any translated transmit pulses, a receive element measuring an echo from a first transmit pulse is matched with a different receive element measuring an echo from a second or subsequent transmit pulse, the match corresponding to receivers with a spatial separation opposite of the translated transmit apertures. Thus, a receive element defined relative to each of the translated transmit pulses will be matched with other receive elements from the other translated pulses and will be compared for received signal variations.

Normally, at least two transmit apertures are employed which are translated relative to each other. In order to determine the "matched" receive elements, the direction of translation of the transmit aperture is first determined, here shown as shift of one element to the right, indicated as positive move (+x direction). The matched receive elements for the two translated pulses/echoes will be an element located at position n (shown as element 2) for the first pulse and an element located at n $-\Delta x$ (a shift in the opposite direction of the translation of the transmit aperture) for the following transmit pulse, shown as element 1. Of course, if the transmit translation is to the left, the matched receive element will be to the right of the first receive element. Likewise, a transmit aperture translated in the +y (vertical upward direction) will have matched elements at (n) and (n−y) (vertical downward direction), respectively.

As described above, this translating transmit aperture generates pulses which are then echoed to a plurality of receive elements. The acoustic echo is measured by activated receive elements and converted into electronic receive signal or echo data at each activated element (n) or at selected positions of activated elements which can then be compared and applied in any number of manners as is conventionally known. The present invention estimates and corrects for signal variations which can include but is not limited to time shift delays.

Figure 6:
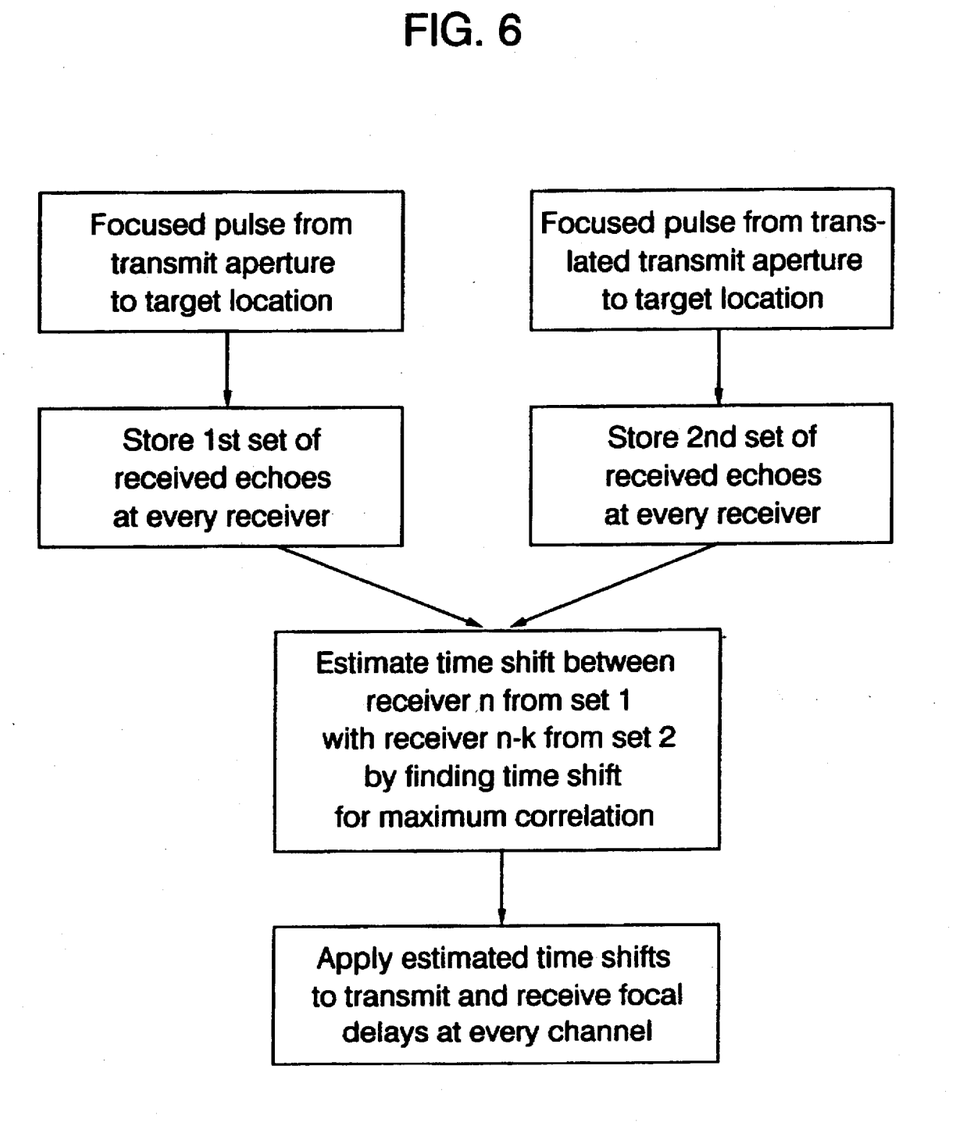
FIG. 6 is a flow chart illustrating an alternative signal processing correction technique.

Exemplary implementations of this technique to improve the performance of existing ultrasound units and conventional phase correction techniques include but are not limited to the following methods as described in the listed references which are incorporated herein by reference as if set forth fully. One type of signal correction is time delay estimation using cross-correlation as described by M. O'Donnell et al. in U.S. Pat. Nos. 4,845,689 and 4,989,143 and as discussed by in S. W. Flax and M. O'Donnell in *Phase Aberration Correction Using Signals From Point Reflectors and Diffuse Scatterers: Basic Principles*, 35 IEEE Trans. Ultrason. Ferroelec. Freq. Contr. no. 6, pp. 758–767 (1988). FIG. 6 illustrates how a cross-correlation technique can be applied with the present invention to improve correlations. Another method is Speckle brightness as described by Trahey et al., in U.S. Pat. No. 5,331,964 and Smith et al. in U.S. Pat. No. 4,842,577 and as discussed by L. F. Nock, G. E. Trahey, and S. W. Smith in *Phase Aberration Correction in Medical Ultrasound Using Speckle Brightness as a Quality Factor*, 85 J. Acoust. Soc. Am., no. 5, pp. 1819–1833 (1989). Yet another technique is the partial array reference technique as described by G. C. Ng et al. in *A Comparative Evaluation of Several Phase Aberration Correction Algorithms*, 41 IEEE Trans. Ultrason. Ferroelec. Freq. Contr., no. 5, pp. 631–643 (1994). Time delay estimates obtained by translating transmit apertures could be combined with matrix methods outlined by D. Rachlin in *Direct Estimation of Aberrating Delays in Pulse-Echo Imaging Systems*, 88 J. Acoust. Soc. Am. no. 1, pp. 191–198 (1990), to yield an estimated aberration profile. See also D. L. Liu and R. C. Waag, Time Shift Compensation of Ultrasonic Focus Degradation Using Least Means Squares Error Estimates of Time Delay, 95 J. Acoust. Soc. Am. no. 1, pp. 542–555 (1994). An additional method is time shift adjustment of demodulated signals as described by M. O'Donnell and W. E. Engeler in Correlation-Based Aberration Correction in the Presence of Inoperable Elements, 39 IEEE Trans. Ultrason. Ferroelec. Freq. Contr., no. 6, pp. 700–707 (1992). Finally, a Time shift Estimation technique using sum absolute difference as described by M. Karaman et al. in *Experimental Analysis of a Computationally Efficient Phase Aberration Correction Technique*, Proc. 1992 IEEE Ultrason. Symp., pp. 619–622 (1992), can also be used with the instant invention.

The first echo data is preferably stored in memory identifiable by element location or position. The second echo data is also preferably stored, at least transiently, into memory and is also identifiable by element location or position. Of course, the second or subsequent pulse can be processed directly without storing into memory. The signal processor then compares the data at either each set of matched receive elements, or at a selected number of the set of matched receive elements.

Figure 5:
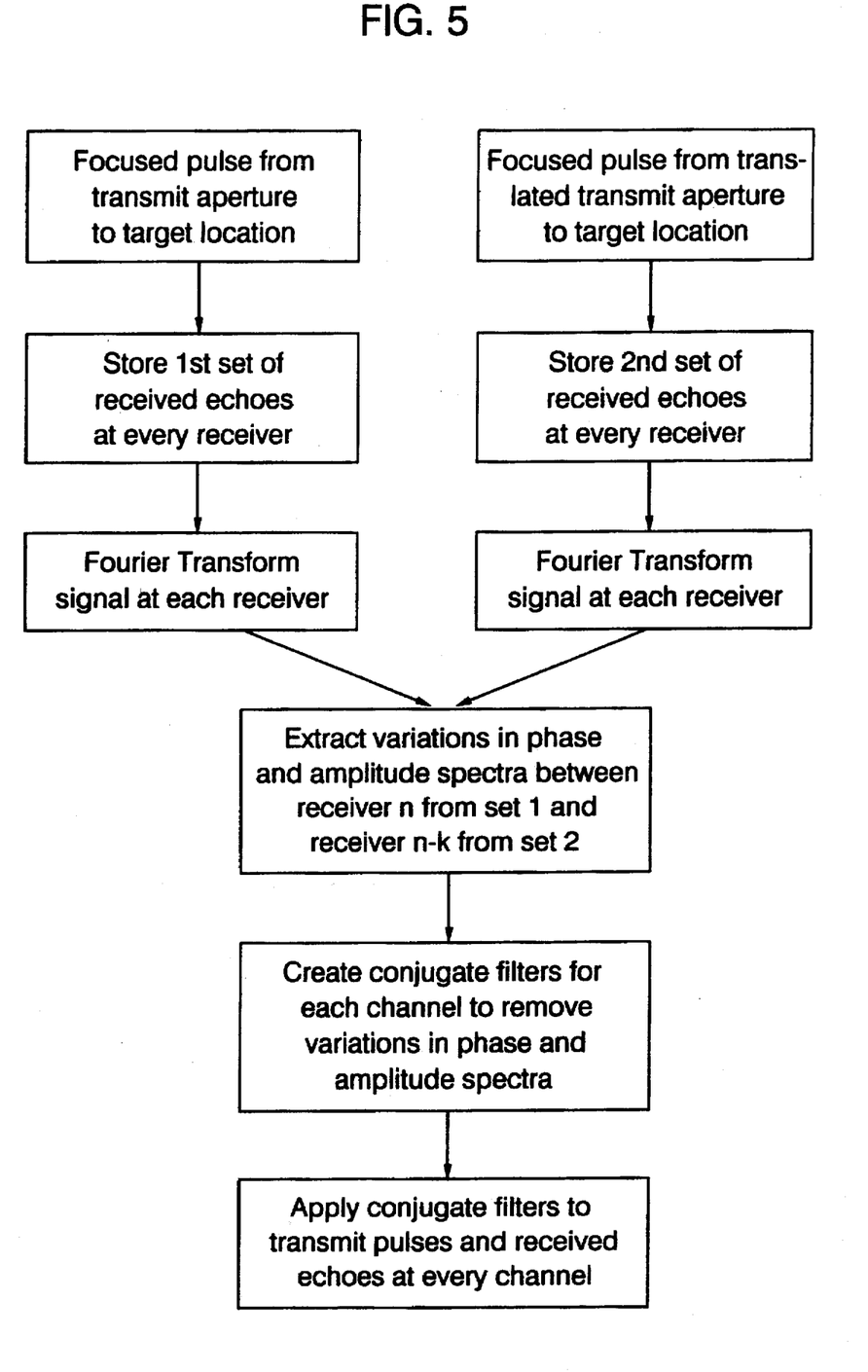
FIG. 5 is a flow chart illustrating a translating transmit aperture with conjugate filters as a signal correction technique.

For distributed aberrators, a Fourier Transform is preferably applied to the signal data. As illustrated by the flowchart in FIG. 5, this allows the signal processor to extract phase spectra variations of the signals and additionally or optionally amplitude spectra variations between matched receivers. Because the frequency dependent phase and amplitude variations attributed to phase aberrations are estimated, the signal processor can then preferably create conjugate filters to adjust transmit pulses and received echoes at every channel, or only at selected channels. Of course the same signal adjustment could be applied only to the received signal, only to the transmit signal or both. Conjugate filters are preferred over cross-correlation techniques when the predominant aberrator is a distributed aberrator.

One way to generate a filter for a translation where $\Delta x=k$, is to design the conjugate filter to make the receive signal at element n–k from the second transmit look like that of element n from the first transmit. For example, when k=1, the conjugate filter for element 2 (when using element 1 as the reference) is derived using variations between the echo received by element 1 for the second transmission and the echo received by element 2 for the first transmission. Then received echoes for element 3 is filtered by two filters, one corresponding to that derived for elements 1 and 2 as explained above and the other for the received echoes from the first and second transmits for elements 2 and 3 in the same manner as described for elements 1 and 2. This building of filters continues across the array. These filters may be applied sequentially or a single filter may be applied in the aggregate. The filters can also be applied to either a transmit or receive signal data. In this example, the reference element is the first element but any element could also serve as the reference. Of course, one of skill in the art will recognize that filter construction and actual phase aberration estimations based on the translated/measured signal variations can be applied in any number of ways.

As discussed above, if the transmit translation is in the positive (rightward) direction then the receive elements are matched such that the first receive element and the second receive element located in the opposite or as described here, the negative (leftward) direction a distance corresponding to the transmit translation shift.

Another preferred method to process the signal data is to separate and store (or store then separate) the received echoes as described above. The data is preferably separated for each element into multiple frequency bins to estimate the signal error due to phase aberrators. This signal processing, like the phase conjugate method, compares phase spectra of the echoed signals between matched elements. However, instead of employing phase conjugate filters, this phase spectra analysis divides the data into a plurality of distinct frequency bins to estimate the variations or errors at typically fewer frequency points. The errors are estimated as a time delay within each frequency bin using any of the time compensation techniques. Some or all of the signals in each of the corrected frequency bins could then be added together to generate a corrected broadband signal. Thus, the corrected broadband can be used to correct both transmit and receive signals.

As discussed above, speckle and point targets refer to two different types of image targets. Point targets are bright, very compact targets such as some relatively few types of breast calcification targets. However, the predominant imaging targets are diffuse groups of scatterers generally known as speckle targets.

Received echoes returned from point targets (in the absence of any velocity inhomogeneities) exhibit the same magnitude and phase spectra at each element after geometric beamforming. Therefore, the distortions attributed to acoustic velocity inhomogeneities from element to element can be compensated by forcing the received echo at every element to have the same amplitude and phase spectra as the reference.

In contrast, speckle arises from interference between acoustic pulses reflected from a set of diffuse scatterers. Even in an acoustically homogeneous medium, the magnitude and phase spectra of the received speckle signals are decorrelated from receiver to receiver as described by the van Cittert-Zernike Theorem, described by R. Mallart and M. Fink in *The van Cittert-Zernike theorem in pulse echo measurements*, J. Acoust. Soc. Am., vol. 90, no. 5, pp. 2718–2727 (1991). The disclosure of which is incorporated herein in full by reference. Velocity inhomogeneities introduce further distortions in the amplitude and phase spectra of the received echoes. See William F. Walker, *Adaptive Ultrasonic Imaging Performance For Near-Field Aberrating Layers*, Dissertation, Dept. of Biomedical Engr., Duke University (1995). Application of phase conjugation without translating apertures on a speckle target results in the unwanted removal of geometric decorrelation due to the transducer array geometry and target relationship as well as adjusting for the spectral distortion due to aberration.

The correlation function between two speckle signals received at locations spatially separated by a distance $\Delta x$, with one signal obtained by firing transmit aperture $T_0(x)$ and the second obtained from transmit aperture $T_1(x)$, has been derived by Walker (see the above listed dissertation discussing Speckle coherence and implications for adaptive imaging) as:

$$\rho(\Delta x) = \frac{\int_{-\infty}^{\infty} T_0(x) T_1(x+\Delta x) dx}{\sqrt{\int_{-\infty}^{\infty} T_0^2(x) dx \int_{-\infty}^{\infty} T_1^2(x) dx}} \cdot \exp(-(2\pi f)^2 (R_{\tau\tau}(0) - R_{\tau\tau}(\Delta x))$$

where f is the frequency in Hz and $R_{\tau\tau}(x)$ is the spatial autocorrelation of the aberrator. The term in the exponent is an expression for the aberrator-induced decorrelation, while the terms preceding the exponent relate to speckle decorrelation from the changing spatial relationships between the diffuse scatterers, the transmit apertures, and the receivers separated by $\Delta x$. Inspection of the geometric decorrelation term will show that if $T_0(x)$ and $T_1(x)$ are related by a spatial shift that is exactly equal and opposite to the receiver separation, i.e., $T_1(x-\Delta x)=T_0(x)$, then the geometric decorrelation term reduces to one. Thus, two sets of received echoes at elements separated by $\Delta x$, are perfectly correlated in the absence of aberration, if the transmit aperture used for obtaining the second set is focused at the same point as the first transmit, but is spatially displaced from the first transmit aperture by an opposite shift of $-\Delta x$. The translating transmit aperture technique employs corresponding transmit aperture shifts to compensate for the change in target-receiver position such that the two transmit-receive aperture pairs interrogate the same spatial frequencies of the target.

Referring now to the flowchart in FIG. 6, an alternative way to analyze the received element data is to estimate a time shift between matched receiver n from the first transmit aperture and receiver n–k for the second transmit aperture. In this example, the term $\Delta x=(k)$ indicating a positive spatial translation of the second transmit aperture relative to the first transmit aperture (and therefore an opposite or negative translation of the matched receivers). The time shift can be estimated by finding the time shift which maximizes correlation of the two signals at the matched elements.

Although the description has described pulses from two translating transmit apertures, multiple iterations of the technique could improve the performance of the method by providing additional correlation data further improving the estimates of the phase aberrators. Iterations can include either or both further repeating the basic translation method to include multiple pulses/translations or repeating the basic correlation technique at the same location but using compensations derived from previous corrections as a starting point for further correction.

Additionally, multiple pulses from transmit apertures translated in a two dimensional direction could also improve the quantification of aberrators. For example a first pulse can be fired from a first transmit aperture; a second pulse from a second transmit aperture which has been translated in the vertical direction; and a third transmit pulse from a third transmit aperture which has been translated in the horizontal direction. Because data is measured multi-directional (in different translational directions), the phase aberrator can be estimated using echoes with higher correlation.

An additional advantage of the translating aperture is to better recognize signal error due to equipment malfunctions. For example, if a phased array activating multiple elements were fired, but one of the elements became inoperable, the signal received by the receive element would be in error. This technique would allow a signal processor to compare shifted elements and flag the malfunction.

Another advantage of the instant invention is that it can be used to calibrate equipment array or electronics non-uniformities prior to use, either at the factory under test conditions or at clinics prior to patient use. For example, transducer arrays have elements disposed at different positions along the structure of the probe. The elements closer to the edges of the probe can be susceptible to thermal deformation as the transducer array heats up during use causing the shape and or the position of an element to change. This, in turn, causes the signal generated from the deformed or flexed element to introduce signal abnormalities into the signal processing unit. Utilizing the translating aperture technique along with signal comparison techniques discussed hereinabove allows for detection of signal error and allows for adjustment or calibration of thermal deflection.

The present method can also be utilized with apodized transmit apertures. Apodization is the weighting of a transmit aperture, typically performed by adjusting the power transmitted by each element. See e.g. Gordon S. Kino, *Acoustic Waves*, ch. 3, §5 (Prentice-Hall, 1st ed. 1987). Apodization may improve correlation by increasing the depth over which signal geometric beamforming is valid and also reducing energy in the sidelobes of a transmit beam.

Even without a translating aperture, the transmit pulse could be transmitted and echoed to be received and the associated phase spectra can be analyzed as described hereinabove. This multiple frequency analysis improves on conventional signal adjustments by more closely estimating the variations in phase and amplitude spectra from a distributed aberrator and adjusting the signal at multiple frequencies instead of applying a given time delay for a broadband signal (in effect, applying a single linear phase tilt across all frequencies).

Under some circumstances, it may be preferable to employ a search mode for steering of a transmitted pulse. This is desirable in situations whereby a subsequent translated transmit aperture is focused to the predetermined target but the beam is altered or steered in an acoustic path away from the intended target because of a newly introduced aberrator component which was not present in the prior pulse. For example, when translating a transmit aperture it is possible that a first transmit pulse is transmitted to the target on a path which is on the edge of an aberrator and a subsequent pulse is transmitted to the same target but from a different aperture and a different path which focuses the subsequent pulse through the aberrator (or vice versa). In such a situation, the received signal will have inconsistencies due to this translation. Correction steering can be employed by firing the frist transmit aperture along several steering directions. For each direction, echoes are stored and compared to echoes from the second transmit aperture. Echoes with the highest correlation correspond to those with a corrected steering direction and are used for adaptive imaging.

Thus, multiple subsequent narrow increment (discrete) transmit pulses, preferably from a translated aperture can be employed to locate a desirable signal path having the requisite echo correlation. The multiple differentially steered pulses allow a selectively determinable acoustic wave path and a necessary originating aperture.

Figure 10:
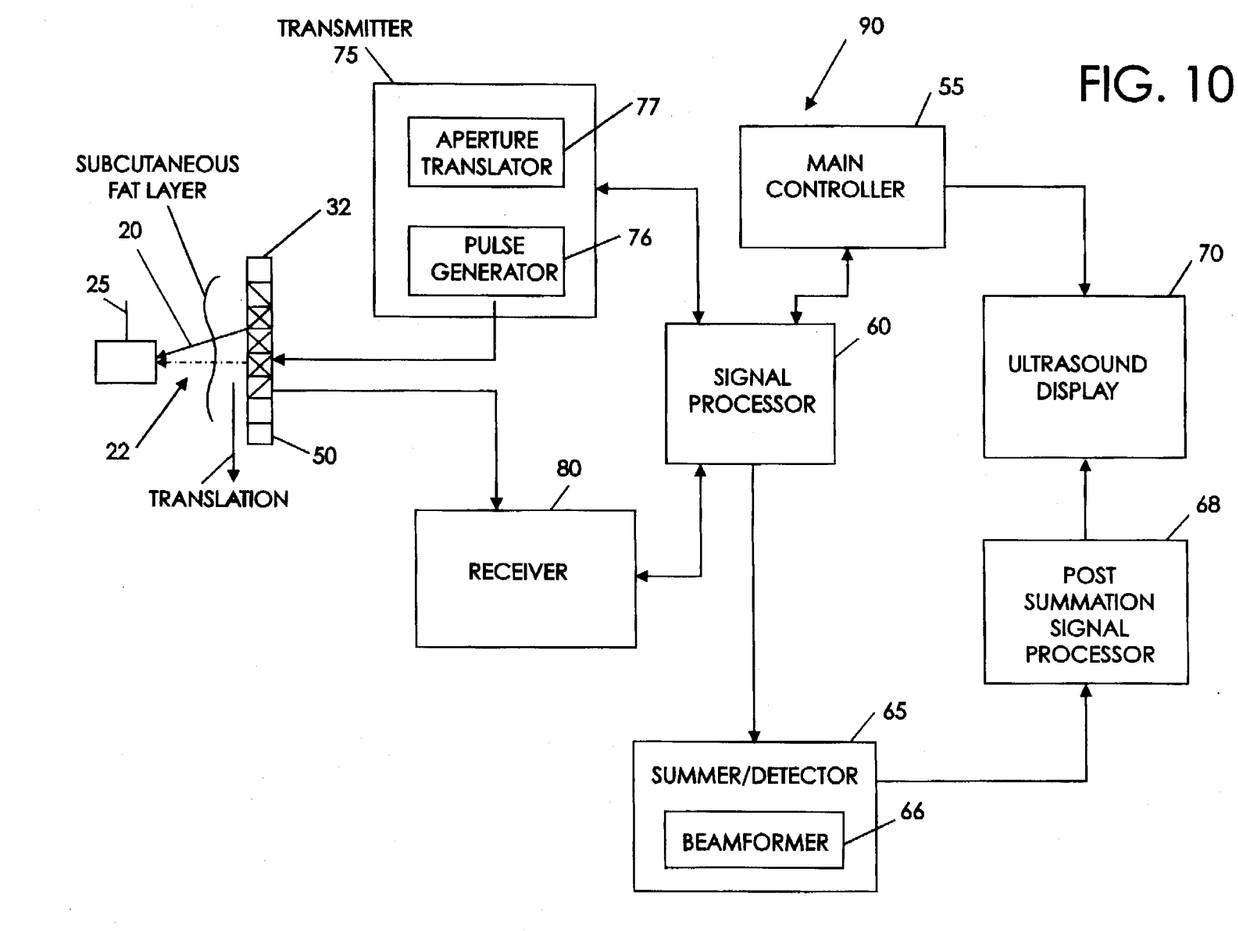
FIG. 10 is a block diagram showing an example of a translating array imaging system according to the present invention.

FIG. 10 shows a block diagram of the imaging system which includes a phased array transducer 50, a main controller 55, a signal processor 60, a summer/detector 65, typically with a beamformer 66, a post summation signal processor 68, an ultrasound display 70, a transmitter 75 having a pulse generator 76 and an aperture translator 77, and a receiver 80. Generally described, the main controller 55 directs the imaging system 90 to obtain an image based upon certain input and preprogrammed patient criteria and target parameters. The transmitter 75 generates a desired pulse from a preselected number of transmit elements 32 in the phased array 50 which is dictated by application. The transmit pulse is focused and transmitted to the desired target 25. The transducer array 50 has a plurality of transducer elements. Memory for storing received electronic signals is provided in the imaging system, typically in the receiver 80 or the signal processor 60. Echo data acquired from a first transmission is typically stored for future computation. The aperture translator 77 directs the subsequent transmit pulse from a translated aperture (relative to a prior aperture) as has been described above. The second echo is processed into receive signal electronic data and is matched with a prior receive element. Echo data is then compared between the corresponding first echo and second echo matched elements. As was described hereinabove, comparison means (typically including a corresponding adjustment or correcting means) for the signal includes cross-correlation, speckle brightness, partial array reference, matrix formulations, demodulated signal time shift adjustment, and sum absolute difference.

Of course, only a subset of the total element information from each element or from selected numbers of elements can be employed to provide appropriate signal variation data to the signal processor 60. In any event, the signal processor 60 and the summer/detector 65 estimates and compensates signal variations based on estimated signal variations. Typically, geometric delays are applied via a beamformer 66. The aberrator is corrected prior to the summer/detector 65, and optionally a post summation signal processor 68 advantageously providing pre-image processing image display signal improvements.

The following examples are provided to illustrate the present invention, and should not be construed as limiting thereof.

EXAMPLE 1

Translating Apertures: Phantom Study

Figure 7:
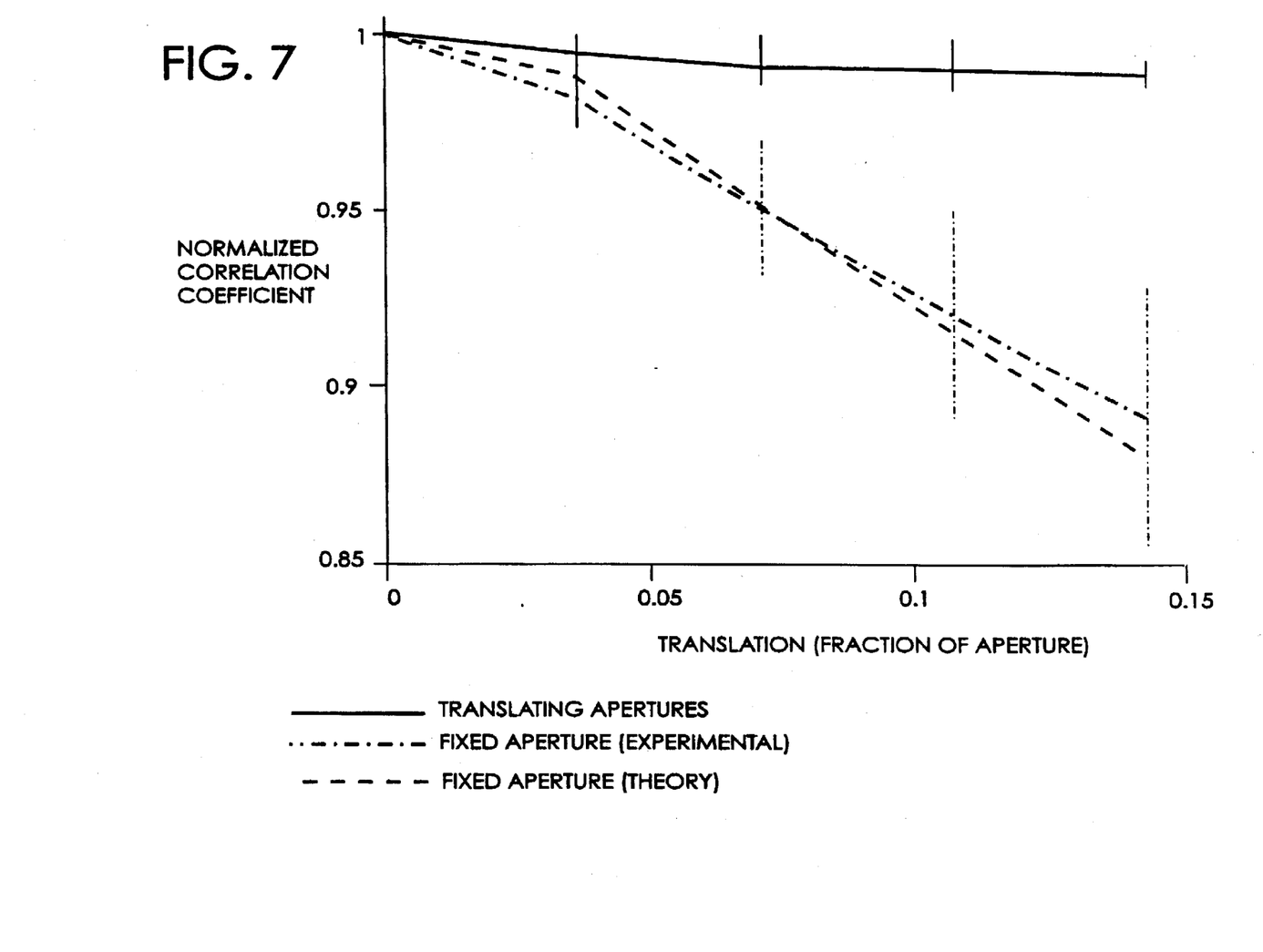
FIG. 7 is a graph illustrating translating aperture results from phantom studies.

FIG. 7 graphically illustrates improved correlation results over conventional fixed apertures obtained experimentally over a variety of translation sizes. This experiment was performed on a Nuclear Associates Multi-Purpose speckle-generating phantom using a translating transmit aperture of 28 elements with a 5 MHz probe. The fixed aperture data corresponds to the conventional case wherein a target is insonified (interrogated) only once using a single fixed transmit aperture. The fixed aperture data was obtained by performing a single transmit from the 28 element transmit aperture and extracting the correlation coefficient between the received speckle signals at elements separated by different spatial separations. The first data point (at 0) is obtained by correlating the received echo at each element with itself, the second data point is obtained by correlating the received echoes at each element with its adjacent neighbor ($\Delta X=1$ element, or $1/28$ of the aperture), and the third data point is obtained by correlating the received echoes at each receiver with a receiver two elements away ($\Delta X=2$) etc. For the translating transmit apertures, the first set of received echoes is formed by transmitting from one transmit aperture, then the second set of received echoes is formed by transmitting from a second aperture shifted by one element laterally ($\Delta x=-1$), then the third set is obtained by transmitting from a third aperture shifted by one further element and so on. The received echoes from all of these transmits are stored, and the received echoes are correlated in the manner as described above, i.e., receiver n signal from transmit 1 is correlated with receiver n+1 from the second transmit to get the correlation of received echoes for a matched receiver spatial separation of $\Delta X=1$ element, and receiver n signal from transmit 1 is correlated with receiver n+2 signal from the third transmit to get the correlation of received echoes for a matched receiver separation of $\Delta X=2$. The fixed aperture theory plot is obtained using the van-Cittert-Zernike Theorem, which predicts what these correlations would be for a given spatial separation when speckle targets are interrogated with a single fixed aperture.

EXAMPLE 2

Correction Using Translating Apertures

Figure 8:
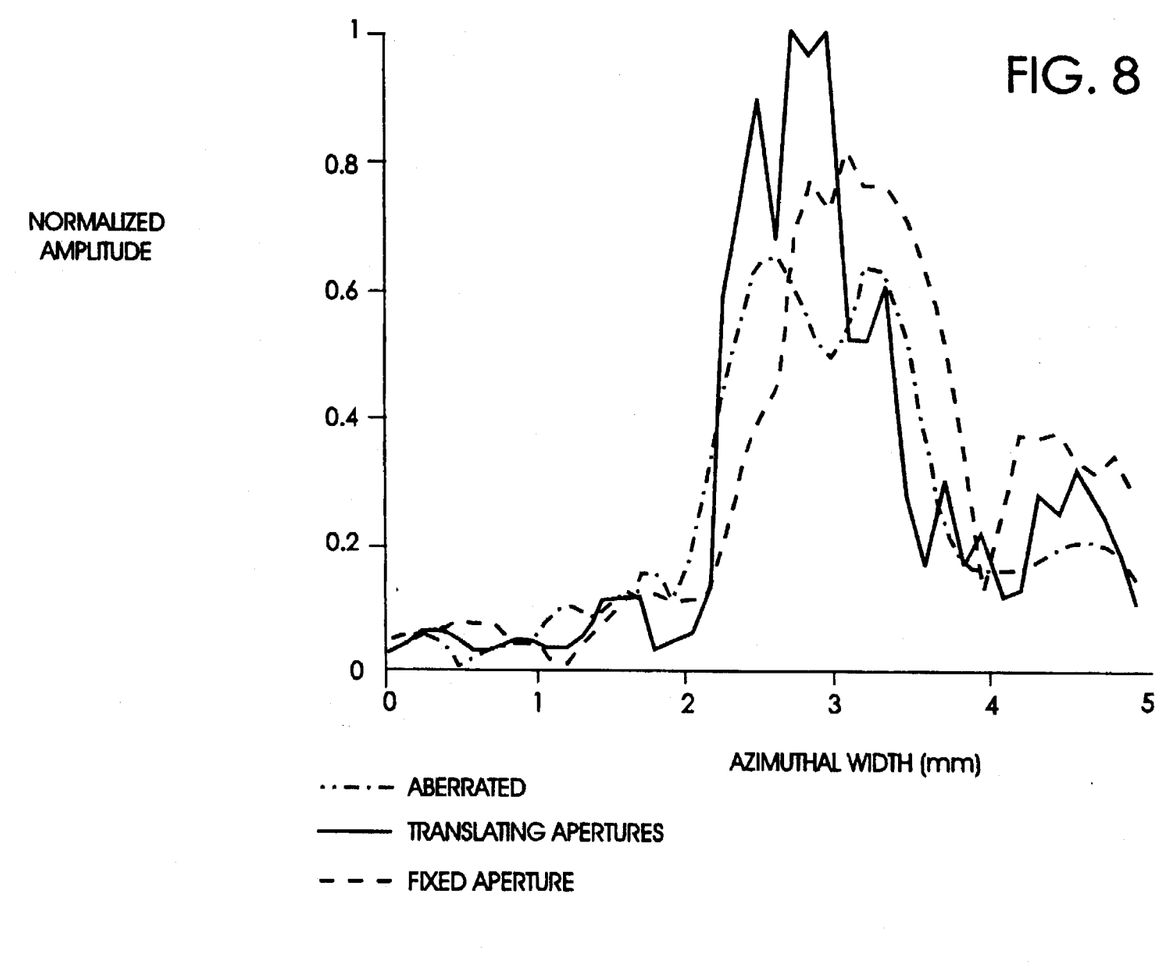
FIG. 8 is a graph illustrating correction of signals using translating apertures.

FIG. 8 graphically illustrates improvements resulting from a translating transmit aperture method according to the present invention (as illustrated in FIG. 6). A preliminary study was done using the translating transmit aperture technique with the Flax-O'Donnell phase aberration correction technique, using a point target embedded in speckle, imaged using the 5 MHz Probe, through a silicone aberrator constructed for this experiment. One set of received echoes was acquired by firing a single transmit pulse from a 60 element transmit aperture, and storing the received echoes at every receiver. A second pulse was fired from a transmit aperture laterally translated by +2 elements to the right. This second set of received echoes was stored as well. Two sets of time delay profiles were estimated. One set was estimated using the received echoes within a single set of received data. This is termed the fixed aperture case. The second set of time delay profiles was estimated by finding the time shift that gave peak correlation between received data on element n from set 1 and received data on element n-2 from the second set (leftward shift of receivers relative to opposing or rightward directed transmit translation). The two sets of time delay profiles were then used in conjunction with the geometric time delay focusing to reconstruct the image of the point target. The plot shows a lateral slice of the amplitude of the point target, across a series of scan lines. The aberrated plot is the amplitude of the point target when only geometric beamforming is used to focus the received data prior to summation. The translating apertures plot is the amplitude of the point target when the time delay profile estimated using translating apertures is used in addition to geometric beamforming, and the fixed aperture plot is the point target amplitude when the time delays estimated using a single fixed aperture is used. The larger point target amplitude and narrower full-width at half maximum when translating apertures is used demonstrates that better signal alignment is obtained between received channels. In summary, this study indicates that a translating aperture method improves on and outperforms the conventional Flax-O'Donnell correction technique performed using a single fixed aperture. In application, this should yield improved image quality.

The foregoing is illustrative of the present invention and is not to be construed as limiting thereof. The invention is defined by the following claims, with equivalents of the claims to be included therein.

That which is claimed is:

1. A method for phase aberration correction for use with medical ultrasound imaging systems employing a probe in contact with the body of a subject, comprising:

generating a first ultrasound pulse at a first set of preselected transmit elements to define a first transmit aperture;

focusing said first ultrasound pulse to a predetermined target point in said subject;

transmitting said first focused ultrasound pulse from said first aperture to said target location;

receiving echoes of said first ultrasound at a first plurality of receive transducer elements;

storing electronic signal data corresponding to said first pulse echoes measured by a predetermined number of said first plurality of receive elements;

generating a second ultrasound pulse at a second set of preselected transmit elements different from said first set of preselected transmit elements to define a second transmit aperture spatially translated relative to said first transmit aperture;

focusing said second ultrasound pulse to said target location;

transmitting said second focused ultrasound pulse from said second transmit aperture to said target location;

receiving echoes of said second ultrasound pulse at a second plurality of receive transducer elements;

processing electronic signal data corresponding to said second pulse echo measured by each of a predetermined number of said second plurality of receive elements;

comparing variations of electronic signal data between said first and second echoes to estimate signal variations; and correcting said phase aberrations with said estimated signal variations.

2. A method according to claim 1 wherein said second transmit aperture is configured to be substantially the same size and shape as said first transmit aperture.

3. A method according to claim 1 further comprising analyzing said echo signal data variations to determine the need for adjusting an acoustic pulse path of one of said transmit pulses to improve signal data correlation.

4. A method according to claim 3 further comprising a third transmit pulse transmitted from a third aperture, whereby said third pulse is a plurality of differentially steered pulses provided to determine a suitable acoustic wave path to provide corrective beam steering to remove or account for an aberrator component located on a translated transmit aperture acoustic wave path.

5. A method according to claim 1 wherein said correcting step compensates the received signal.

6. A method according to claim 1 wherein said correcting step compensates the transmitted signal.

7. A method according to claim 1 wherein each of said first plurality of receive elements is matched with a respective one of said second plurality of receive elements.

8. A method according to claim 7 wherein said comparing step compares signal phase spectra of said signal data at a preselected number of matched receive elements.

9. A method according to claim 8 further comprising calculating the phase conjugate of the variations of phase spectra between predetermined matched receive elements.

10. A method according to claim 7 wherein said comparing steps compares signal amplitude spectra of said signal data at a preselected number of matched receive elements.

11. A method according to claim 1 further comprising:
separating said signal data from said first and second receive pulse echoes at each of said predetermined receive elements into multiple frequency segments to estimate phase spectra variations in each segment.

12. A method according to claim 8 or 11 further comprising performing a discrete Fourier transform on each of said first and second echo signal data.

13. A method according to claim 1 wherein said second transmit aperture is linearly translated with respect to said first transmit aperture.

14. A method according to claim 1 wherein said second transmit aperture is translated in two dimensions with respect to said first transmit aperture.

15. A method according to claim 1 said second transmit aperture being spatially translated a small translation width of about less than 10 elements tall or long.

16. A method according to claim 1 said second transmit aperture being spatially translated a large translation of more than 10 elements tall or long.

17. A method according to claim 1 further comprising:
generating a third ultrasound pulse at third set of preselected transmit elements different from said first and second set of transmit elements to define a third transmit aperture spatially translated and having substantially the same size and shape relative to said first and second apertures;
focusing said third ultrasound pulse in said subject;
transmitting said third focused ultrasound pulse from said third aperture to said target location;
receiving third pulse echoes of said third ultrasound pulse at a third plurality of receive transducer elements;
processing electronic signal data corresponding to said third pulse echoes measured by a predetermined number of said third plurality of receive elements;
comparing variations between said first, second and third receive signal data to estimate signal variations; and
correcting said phase aberrations with said estimated signal variations.

18. A method according to claim 1 wherein the steps are repeated to improve the estimates of phase aberrations.

19. A method according to claim 1 wherein said transmit elements are formed on a sparse array.

20. A method for estimating and correcting phase aberrations in signals, comprising:
generating a first ultrasound pulse;
focusing said first ultrasound pulse to a predetermined target location;
transmitting said first focused ultrasound pulse into the target;
receiving first pulse echoes of said first ultrasound pulse at a plurality of receive transducer elements;
storing electronic signal data corresponding to said first pulse echoes measured by a predetermined number of said plurality of receive elements;
comparing phase spectra variations of said electronic signal data between a predetermined number of receive elements to estimate signal variations; and
correcting said phase aberrations with said estimated signal variations by providing frequency dependent phase spectra compensating adjustment to a signal.

21. A method according to claim 20 wherein said comparing step includes comparing amplitude spectra and said correcting step includes providing amplitude spectra compensating adjustment to a signal.

22. A method for correcting distributed aberrations in ultrasound imaging systems, comprising:
generating a first ultrasound pulse at a first set of preselected transmit elements to define a first transmit aperture;
focusing said first ultrasound pulse to a predetermined target location in a target object;
transmitting said first focused ultrasound pulse from said first aperture into said target;
receiving first pulse echoes of said first ultrasound pulse at a first plurality of receive transducer elements;
storing electronic signal data corresponding to said first pulse echoes measured by each of a predetermined number of said plurality of receive elements;
generating a second ultrasound pulse at second set of preselected transmit elements different from said first set of transmit elements to define a second transmit aperture having substantially the same size and shape and spatially translated relative to said first aperture;
focusing said second ultrasound pulse to said target location;
transmitting said second focused ultrasound pulse from said second aperture into said target;
receiving second pulse echoes of said second ultrasound pulse at a second plurality of receive transducer elements;
processing electronic signal data corresponding to said second echo measured by a predetermined number of said second plurality of receive elements, wherein each of said first plurality of receive elements is matched with a respective one of said second plurality of receive elements corresponding to said transmit aperture translation;
comparing signal phase spectra included in said electronic signal data between said first and second pulse echoes at a preselected number of matched receive elements to estimate signal variations; and
correcting phase aberrations with said estimated signal variations.

23. A method according to claim 22 wherein said correcting step compensates the receive signal.

24. A method according to claim 22 wherein said correcting step compensates the transmit signal.

25. A method according to claim 22 wherein said comparing steps further compares signal amplitude spectra of said electronic signal data between matched receive elements.

26. An ultrasonic phased array imaging system having a translating aperture adaptive mode of operation, said system comprising:

a transducer array having a plurality of elements;

a transmitter for generating and transmitting ultrasound pulses operably associated with said transducer array;

an aperture translator electrically associated with said transmitter and said transducer array for adjusting transmit apertures to spatially shift at least two separate transmit pulses to fire from array transducer elements contained in transmit apertures spatially shifted relative to each other;

a receiver for receiving echoes of transmitted pulses operably associated with said transducer array and electronic circuitry for storing echo signal data received from a target;

a signal processor, said signal processor comprising:

(a) comparison means for estimating received echo data signal variations from translated transmit pulses and measured by receive elements, wherein said comparison means compares signal variations between matched sets of receive elements;

a beamformer operably associated with said signal processor for compensating for geometric array configurations and target relationships; and a correcting means operably associated with said signal processor for adjusting a signal to compensate for aberrator caused signal variations.

27. An apparatus according to claim 26 wherein said comparison means includes means for determining phase spectra variations between data measured by matched receive elements.

28. An apparatus according to claim 26 wherein said comparison means includes means for determining amplitude spectra variations between data measured by matched receive elements.

* * * * *